(12) United States Patent
Samuel et al.

(10) Patent No.: US 10,282,497 B2
(45) Date of Patent: May 7, 2019

(54) MODEL FOR ESTIMATING DRILLING TOOL WEAR

(71) Applicant: Halliburton Energy Services, Inc., Houston, TX (US)

(72) Inventors: Robello Samuel, Cypress, TX (US); Chris Neil Marland, Spring, TX (US); Zhengchun Liu, Sugar Land, TX (US); Dong Li, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 15/110,120

(22) PCT Filed: Feb. 5, 2015

(86) PCT No.: PCT/US2015/014032
§ 371 (c)(1),
(2) Date: Jul. 7, 2016

(87) PCT Pub. No.: WO2015/119875
PCT Pub. Date: Aug. 13, 2015

(65) Prior Publication Data
US 2017/0004235 A1 Jan. 5, 2017

Related U.S. Application Data

(60) Provisional application No. 61/937,347, filed on Feb. 7, 2014.

(51) Int. Cl.
*G06F 17/50* (2006.01)
*E21B 12/02* (2006.01)
(Continued)

(52) U.S. Cl.
CPC ............ *G06F 17/5009* (2013.01); *E21B 7/28* (2013.01); *E21B 10/26* (2013.01); *E21B 10/42* (2013.01);
(Continued)

(58) Field of Classification Search
CPC .. G06F 17/5009; G06F 17/11; G06F 2217/16; E21B 7/28; E21B 10/26; E21B 10/42; E21B 12/02
(Continued)

(56) References Cited

U.S. PATENT DOCUMENTS 4,627,276 A * 12/1986 Burgess ................. E21B 44/00
175/39
5,205,836 A 4/1993 Hansen et al.
(Continued)

FOREIGN PATENT DOCUMENTS

| CN | 106103892 | 11/1916 |
|----|-----------|---------|
| CN | 1214754 | 4/1999 |

(Continued)

OTHER PUBLICATIONS

Kuttolannadonn_2012 (Prediction of the Wear & Evolution of Cutting Tools in a Carbide /Ti-6Al-4V Machinging Tribosystem by Volumetric Tool WEar Characterization & Modeling, Clemson University, Aug. 2012).*

(Continued)

*Primary Examiner* — Brian S Cook
(74) *Attorney, Agent, or Firm* — Baker Botts L.L.P.

(57) ABSTRACT

A method for estimating the wear of a drilling tool is disclosed. The method includes selecting a first incremental distance along a length of a formation. The method further includes determining a first characteristic of the formation along the first incremental distance. The method further includes deriving a first fractional wear factor, $y_1$, for the (Continued)

drilling tool based on the first characteristic of the formation and a first operating condition of the cutting element. The method further includes calculating a first wear function, $W_{f1}$, the cutting element based on the first fractional wear factor and estimating an amount of wear of the cutting element during a drilling operation based on the first wear function.

20 Claims, 9 Drawing Sheets

(51) Int. Cl.
*E21B 7/28* (2006.01)
*E21B 10/26* (2006.01)
*E21B 10/42* (2006.01)
*G06F 17/11* (2006.01)

(52) U.S. Cl.
CPC .............. *E21B 12/02* (2013.01); *G06F 17/11* (2013.01); *G06F 2217/16* (2013.01)

(58) Field of Classification Search
USPC ............................................................ 703/2
See application file for complete search history.

(56) References Cited

U.S. PATENT DOCUMENTS

| | | | |
|---|---|---|---|
| 5,415,030 A | 5/1995 | Jogo et al. | |
| 5,794,720 A | 8/1998 | Smith | |
| 6,408,953 B1 | 6/2002 | Goldman et al. | |
| 8,534,391 B2 * | 9/2013 | Wirth | E21B 10/16 175/39 |
| 2004/0059554 A1 * | 3/2004 | Goldman | E21B 12/02 703/7 |
| 2005/0015229 A1 * | 1/2005 | Huang | E21B 10/00 703/10 |
| 2009/0260877 A1 | 10/2009 | Wirth | |

FOREIGN PATENT DOCUMENTS

| | | |
|---|---|---|
| CN | 1341803 | 3/2002 |
| WO | 2015/119875 | 8/2015 |

OTHER PUBLICATIONS

Shabgard_2009 (Mathematical Modeling of Machining Parameters in Electrical Discharg Machining of FW4 Welded Steel, World Academy of Science, Engineering and Technology 28 2009).*
International Preliminary Report on Patentability for PCT Patent Application No. PCT/US2015/014032, dated Aug. 18, 2016; 10 pages.
Office Action for Canadian Patent Application No. 2935247, dated Apr. 25, 2017; 6 pages.
Office Action for Canadian Patent Application No. 2935247, dated Feb. 28, 2018; 6 pages.
International Search Report and Written Opinion, Application No. PCT/US2015/014032; 16 pages.
Liu, Zhengchun, et al., "An Analyltical Model Coupled with Data Analytics to Estimate PDC Bit Wear," Society of Petroleum Engineers, SPE 169451, 7 pages.
Office Action, Chinese Patent Application 201580003429.9, with English translation, 17 pages., dated Oct. 9, 2018.

* cited by examiner

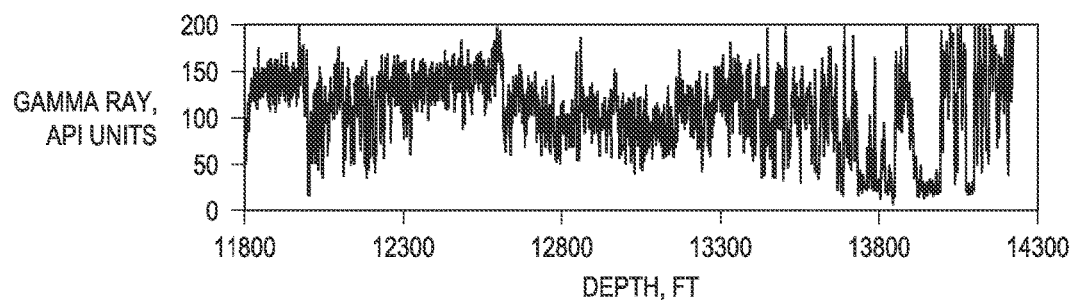
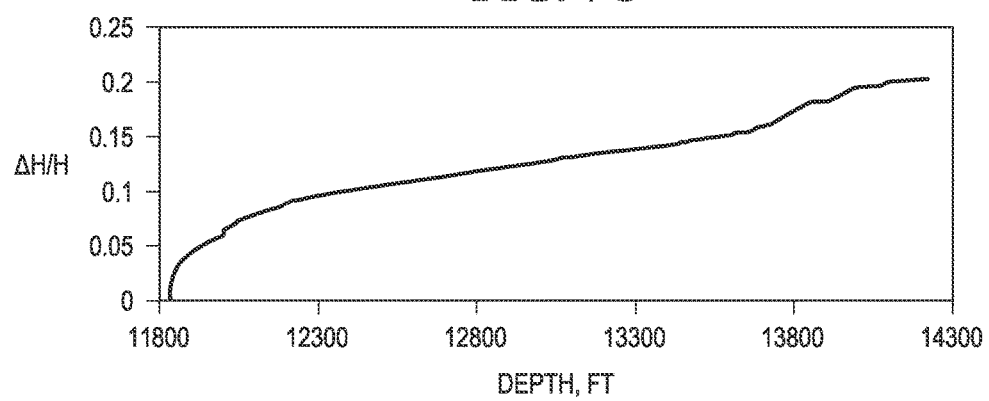

MODEL FOR ESTIMATING DRILLING TOOL WEAR

RELATED APPLICATIONS

This application is a U.S. National Stage Application of International Application No. PCT/US2015/014032 filed Feb. 2, 2015, which designates the United States, and claims the benefit of U.S. Provisional Application Ser. No. 61/937,347 filed on Feb. 7, 2014, which are incorporated herein by reference in their entirety.

TECHNICAL FIELD

The present disclosure relates generally to drilling tools and, more particularly, to a model for estimating the wear of a drilling tool.

BACKGROUND

Various types of drilling tools including, but not limited to, rotary drill bits, reamers, core bits, under reamers, hole openers, stabilizers, and other downhole tools have been used to form wellbores in associated downhole formations. Examples of such rotary drill bits include, but are not limited to, fixed cutter drill bits, drag bits, polycrystalline diamond compact (PDC) drill bits, and matrix drill bits associated with forming oil and gas wells extending through one or more downhole formations. Fixed cutter drill bits such as a PDC bit may include multiple blades that each include multiple cutting elements.

As a drill tool is used in a typical drilling application, the cutting elements experience wear. As a cutting element wears, it becomes less effective and has a higher likelihood of failure. Cutting element wear may have a significant effect on the rate of penetration (ROP). The ROP is important for reducing costs during drilling operations as an increase in the ROP can reduce operating time. ROP is impacted by several variables including the drilling tool type, geological formation characteristics, drilling fluid properties, drilling tool operating conditions, drill bit hydraulics, and drilling tool cutting element wear.

BRIEF DESCRIPTION OF THE DRAWINGS

For a more complete understanding of the present invention and its features and advantages, reference is now made to the following description, taken in conjunction with the accompanying drawings, in which:

FIG. 7A illustrates a graph of a gamma ray profile as a function of drilling depth from a drilling operation;

FIG. 7C illustrates a graph of the simulated fractional wear factor of a cutting element as a function of drilling depth.

DETAILED DESCRIPTION

During a subterranean operation, various downhole tools (e.g., drill bits, coring bits, reamers, and/or hole enlargers) may be lowered in a wellbore. The downhole tools may include cutting elements that wear during the subterranean operation. The wear of the cutting elements may be estimated through the use of analytical models and real-time data obtained during the subterranean operation. The estimation of the wear of the cutting element may provide a more accurate estimation for use in planning the subterranean operation and predicting the life of the cutting element. Embodiments of the present disclosure and its advantages are best understood by referring to FIGS. 1 through 7, where like numbers are used to indicate like and corresponding parts.

Figure 1A:
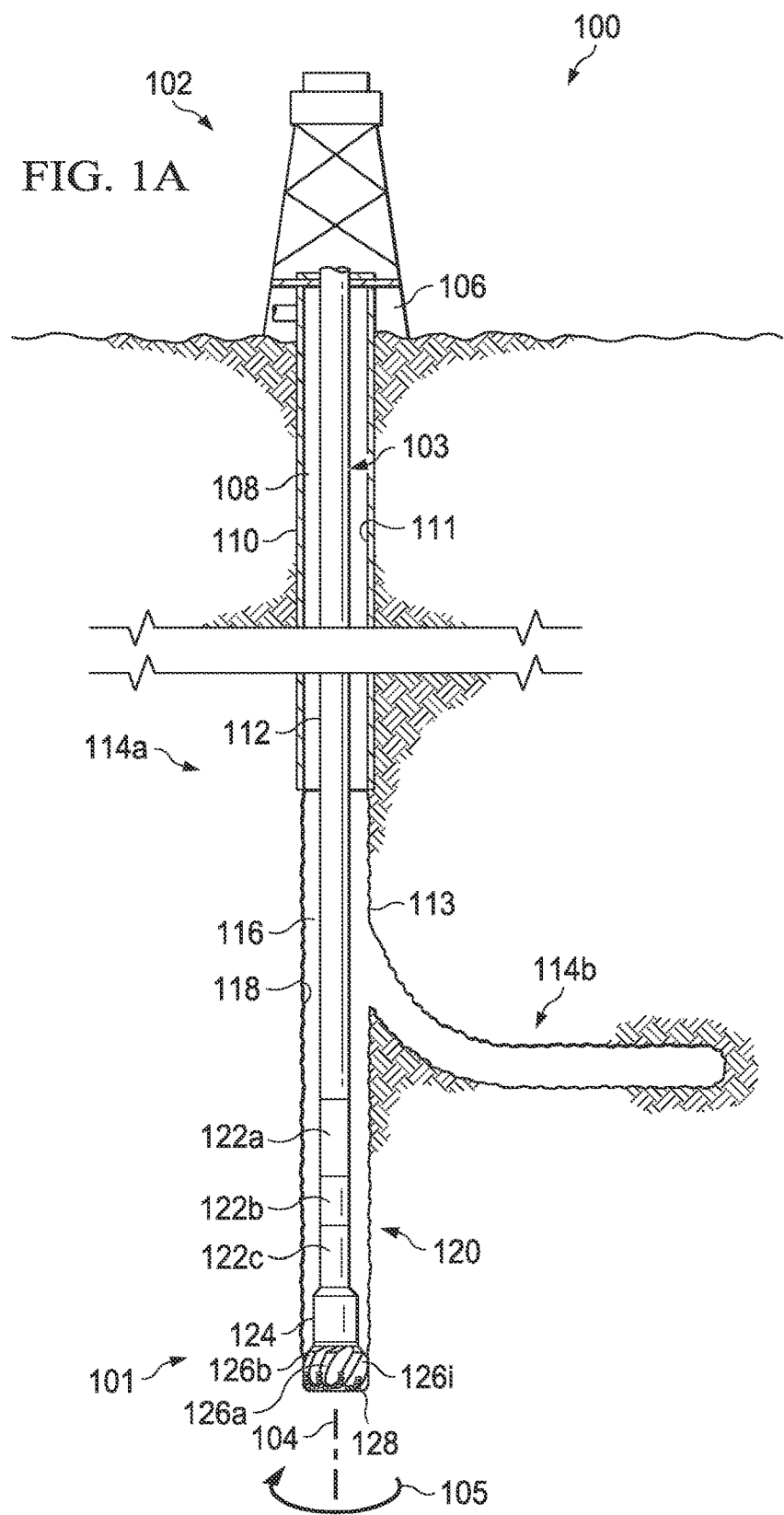
FIG. 1A illustrates an elevation view of an example embodiment of a drilling system.

FIG. 1A illustrates an elevation view of an example embodiment of a drilling system. Drilling system 100 may include a well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles, and/or drilling barges (not expressly shown).

Drilling system 100 may include drill string 103 associated with drill bit 101 that may be used to form a wide variety of wellbores or bore holes such as generally vertical wellbore 114a or generally horizontal wellbore 114b or any combination thereof. Various directional drilling techniques and associated components of bottom hole assembly (BHA) 120 of drill string 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. Such angles may be greater than normal variations associated with vertical wellbores. Direction drilling may also be described as drilling a wellbore deviated from vertical. The term "horizontal drilling" may be used to include drilling in a direction approximately ninety degrees (90°) from vertical.

BHA 120 may be formed from a wide variety of components configured to form wellbore 114. For example, components 122a, 122b and 122c of BHA 120 may include, but are not limited to, drill bits (e.g., drill bit 101), coring bits, drill collars, rotary steering tools, directional drilling tools, downhole drilling motors, reamers, hole enlargers, or stabilizers. The number and types of components 122 included in BHA 120 may depend on anticipated downhole drilling conditions and the type of wellbore that will be formed by drill string 103 and rotary drill bit 101. BHA 120 may also include various types of well logging tools (not expressly shown) and other downhole tools associated with directional drilling of a wellbore. Examples of such logging tools and/or directional drilling tools may include, but are not limited to, acoustic, neutron, gamma ray, density, porosity, sonic, photoelectric, nuclear magnetic resonance, rotary steering tools and/or any other commercially available well tool.

Wellbore 114 may be defined in part by casing string 110 that may extend from well site 106 to a selected downhole location. Portions of wellbore 114, as shown in FIG. 1A, that do not include casing string 110 may be described as "open hole." Various types of drilling fluid may be pumped from well surface 106 through drill string 103 to attached drill bit 101. The drilling fluids may be directed to flow from drill string 103 to respective nozzles passing through rotary drill bit 101. The drilling fluid may be circulated back to well surface 106 through annulus 108. In an open hole well, annulus 108 may be defined in part by outside diameter 112 of drill string 103 and inside diameter 118 of wellbore 114. In a cased wellbore, annulus 108 may also be defined by outside diameter 112 of drill string 103 and inside diameter 111 of casing string 110. Inside diameter 118 may be referred to as the "sidewall" of wellbore 114.

Drilling system 100 may also include rotary drill bit ("drill bit") 101. Drill bit 101, discussed in further detail in FIG. 1B, may include one or more blades 126 that may be disposed outwardly from exterior portions of rotary bit body 124 of drill bit 101. Rotary bit body 124 may be generally cylindrical and blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

Drill bit 101 may be modeled to predict the wear of cutting elements 128 during a drilling operation to allow for more accurate rate of penetration (ROP) calculations. In one embodiment, a wear model may combine the use of analytical models and real-time data analytics into a single modeling method. Models may also be used to predict the wear of drilling tools other than drill bit 101 such as reamers, under reamers, hole openers, or any cutting structure on BHA 120.

Figure 1B:
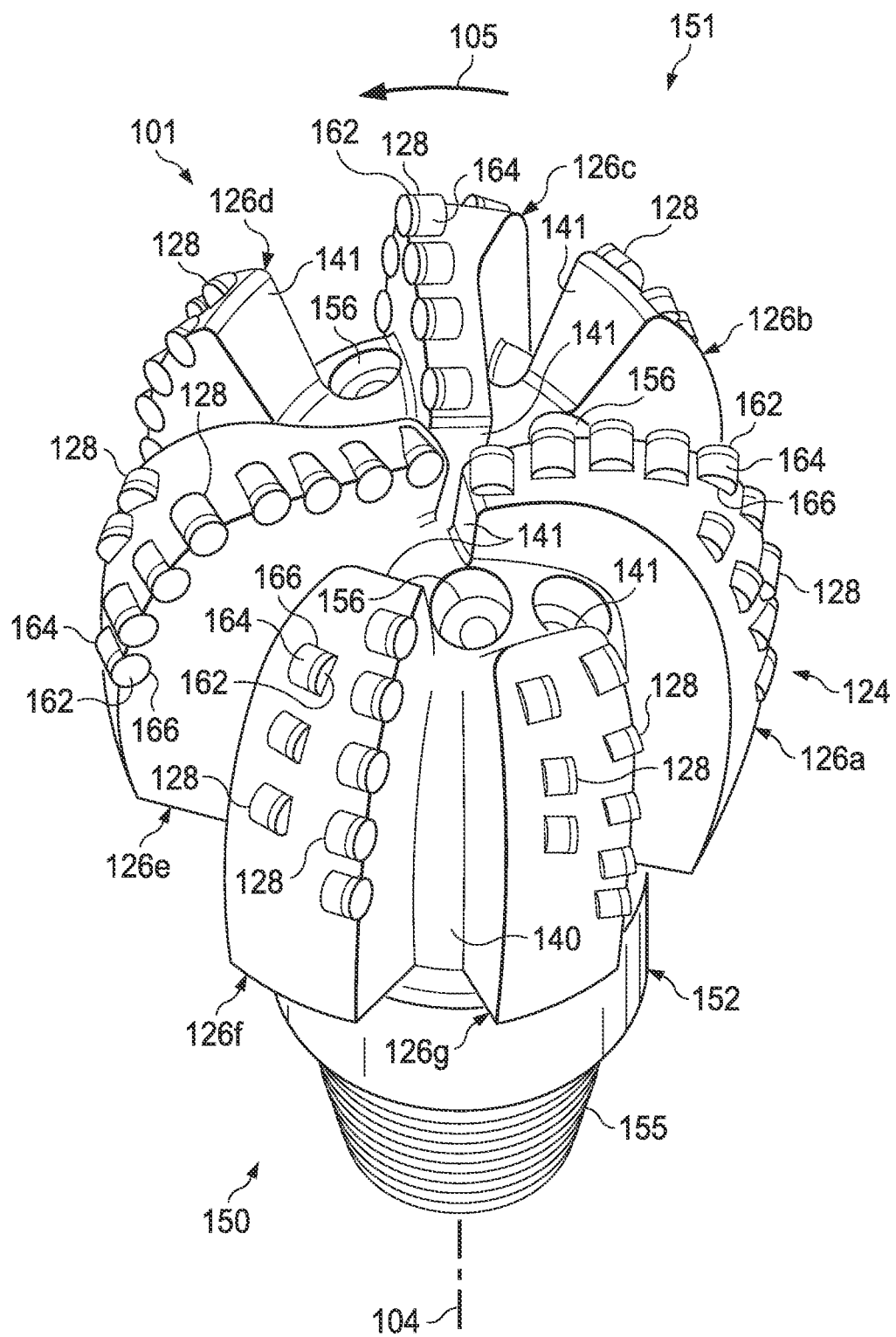
FIG. 1B illustrates an isometric view of a rotary drill bit oriented upwardly in a manner often used to model or design fixed cutter drill bits.

FIG. 1B illustrates an isometric view of a rotary drill bit oriented upwardly in a manner often used to model or design fixed cutter drill bits. Drill bit 101 may be any of various types of fixed cutter drill bits, including PDC bits, drag bits, matrix body drill bits, steel body drill bits, and/or combination drill bits including fixed cutters and roller cone bits operable to form wellbore 114 (as illustrated in FIG. 1A) extending through one or more downhole formations. Drill bit 101 may be designed and formed in accordance with teachings of the present disclosure and may have many different designs, configurations, and/or dimensions according to the particular application of drill bit 101.

Drill bit 101 may include one or more blades 126a-126g, collectively referred to as blades 126, that may be disposed outwardly from exterior portions of rotary bit body 124. Rotary bit body 124 may have a generally cylindrical body and blades 126 may be any suitable type of projections extending outwardly from rotary bit body 124. For example, a portion of blade 126 may be directly or indirectly coupled to an exterior portion of bit body 124, while another portion of blade 126 may be projected away from the exterior portion of bit body 124. Blades 126 formed in accordance with the teachings of the present disclosure may have a wide variety of configurations including, but not limited to, substantially arched, helical, spiraling, tapered, converging, diverging, symmetrical, and/or asymmetrical.

Each of blades 126 may include a first end disposed proximate or toward bit rotational axis 104 and a second end disposed proximate or toward exterior portions of drill bit 101 (i.e., disposed generally away from bit rotational axis 104 and toward uphole portions of drill bit 101). The terms "downhole" and "uphole" may be used in this application to describe the location of various components of drilling system 100 relative to the bottom or end of a wellbore. For example, a first component described as "uphole" from a second component may be further away from the distal end of the wellbore 114 than the second component. Similarly, a first component described as being "downhole" from a second component may be located closer to the distal end of the wellbore 114 than the second component.

In some cases, blades 126 may have substantially arched configurations, generally helical configurations, spiral shaped configurations, or any other configuration satisfactory for use with each drilling tool. One or more blades 126 may have a substantially arched configuration extending from proximate rotational axis 104 of drill bit 101. The arched configuration may be defined in part by a generally concave, recessed shaped portion extending from proximate bit rotational axis 104. The arched configuration may also be defined in part by a generally convex, outwardly curved portion disposed between the concave, recessed portion and exterior portions of each blade which correspond generally with the outside diameter of the rotary drill bit.

Blades 126 may have a general arcuate configuration extending radially from rotational axis 104. The arcuate configurations of blades 126 may cooperate with each other to define, in part, a generally cone shaped or recessed portion disposed adjacent to and extending radially outward from the bit rotational axis. Exterior portions of blades 126, cutting elements 128 and other suitable elements may be described as forming portions of the bit face.

Blades 126a-126g may include primary blades disposed about the bit rotational axis. For example, in FIG. 1B, blades 126a, 126c, and 126e may be primary blades or major blades because respective first ends 141 of each of blades 126a, 126c, and 126e may be disposed closely adjacent to associated bit rotational axis 104. In some embodiments, blades 126a-126g may also include at least one secondary blade disposed between the primary blades. Blades 126b, 126d, 126f, and 126g shown in FIG. 1B on drill bit 101 may be secondary blades or minor blades because respective first ends 141 may be disposed on downhole end 151 a distance from associated bit rotational axis 104. The number and location of primary blades and secondary blades may vary such that drill bit 101 includes more or less primary and secondary blades. Blades 126 may be disposed symmetrically or asymmetrically with regard to each other and bit rotational axis 104 where the disposition may be based on the downhole drilling conditions of the drilling environment. In some cases, blades 126 and drill bit 101 may rotate about rotational axis 104 in a direction defined by directional arrow 105.

Each blade may have a leading (or front) surface 130 disposed on one side of the blade in the direction of rotation of drill bit 101 and a trailing (or back) surface 132 disposed on an opposite side of the blade away from the direction of rotation of drill bit 101. Blades 126 may be positioned along bit body 124 such that they have a spiral configuration relative to rotational axis 104. In other embodiments, blades 126 may be positioned along bit body 124 in a generally parallel configuration with respect to each other and bit rotational axis 104.

Blades 126 may include one or more cutting elements 128 disposed outwardly from exterior portions of each blade 126. For example, a portion of cutting element 128 may be directly or indirectly coupled to an exterior portion of blade 126 while another portion of cutting element 128 may be projected away from the exterior portion of blade 126. Cutting elements 128 may be any suitable device configured to cut into a formation, including but not limited to, primary cutting elements, back-up cutting elements, secondary cutting elements, or any combination thereof. By way of example and not limitation, cutting elements 128 may be various types of cutters, compacts, buttons, inserts, and gage cutters satisfactory for use with a wide variety of drill bits 101.

Cutting elements 128 may include respective substrates with a layer of hard cutting material, e.g., cutting table 162, disposed on one end of each respective substrate, e.g., substrate 164. Cutting table 162 of each cutting elements 128 may provide a cutting surface that may engage adjacent portions of a downhole formation to form wellbore 114. Each substrate 164 of cutting elements 128 may have various configurations and may be formed from tungsten carbide with a binder agent such as cobalt or other materials associated with forming cutting elements for rotary drill bits. Tungsten carbides may include, but are not limited to, monotungsten carbide (WC), ditungsten carbide ($W_2C$), macrocrystalline tungsten carbide, and cemented or sintered tungsten carbide. Substrates 164 may also be formed using other hard materials, which may include various metal alloys and cements such as metal borides, metal carbides, metal oxides, and metal nitrides. For some applications, cutting table 162 may be formed from substantially the same materials as substrate 164. In other applications, cutting table 162 may be formed from different materials than substrate 164. Examples of materials used to form cutting table 162 may include polycrystalline diamond materials, including synthetic polycrystalline diamonds. Blades 126 may include recesses or bit pockets 166 that may be configured to receive cutting elements 128. For example, bit pockets 166 may be concave cutouts on blades 126.

Blades 126 may further include one or more gage pads (not expressly shown) disposed on blades 126. A gage pad may be a gage, gage segment, or gage portion disposed on exterior portion of blade 126. Gage pads may often contact adjacent portions of wellbore 114 formed by drill bit 101. Exterior portions of blades 126 and/or associated gage pads may be disposed at various angles, positive, negative, and/or parallel, relative to adjacent portions of generally vertical portions of wellbore 114. A gage pad may include one or more layers of hardfacing material.

Uphole end 150 of drill bit 101 may include shank 152 with drill pipe threads 155 formed thereon. Threads 155 may be used to releasably engage drill bit 101 with BHA 120, shown in FIG. 1A, whereby drill bit 101 may be rotated relative to bit rotational axis 104. Downhole end 151 of drill bit 101 may include a plurality of blades 126a-126g with respective junk slots or fluid flow paths 140 disposed therebetween. Additionally, drilling fluids may be communicated to one or more nozzles 156.

During a drilling operation, cutting elements 128 on drill bit 101 will experience wear. Cutting element wear may have a significant effect on the ROP of the drill bit. The ROP may impact costs during drilling operations. For example, as increased ROP reduces operating time for drilling a wellbore. ROP may be impacted by several variables such as the drill bit type, geological formation characteristics (such as rock strength and permeability), drilling fluid properties (such as mud weight and viscosity), drill bit operating conditions (such as weight on bit (WOB) and rotary speed), drill bit hydraulics, and cutting element wear on a drilling tool. In order to accurately model the cutting element wear of drill bit 101, a combination of analytical bit wear models and data analytics using real-time data (such as gamma ray, sonic, density, or porosity data) may be used.

The ROP of a drilling tool can be calculated based on drilling operating parameters, geological formation characteristics, and the geometry and wear of the drilling tool. For example, the ROP for a PDC bit, assuming perfect bit cleaning, is defined by $$ROP = W_f G \frac{WOB^a \cdot N^b}{SD_b} \tag{1}$$

where $W_f$ is the tool wear function, N is the rotary speed, S is the confined compressive rock strength, and a, b, and G are model constraints. G may be based on a characteristic of the geological formation. A model for estimating the tool wear function based on the characteristics of the geological formation and drilling parameters is described in FIG. 5.

Figure 2:
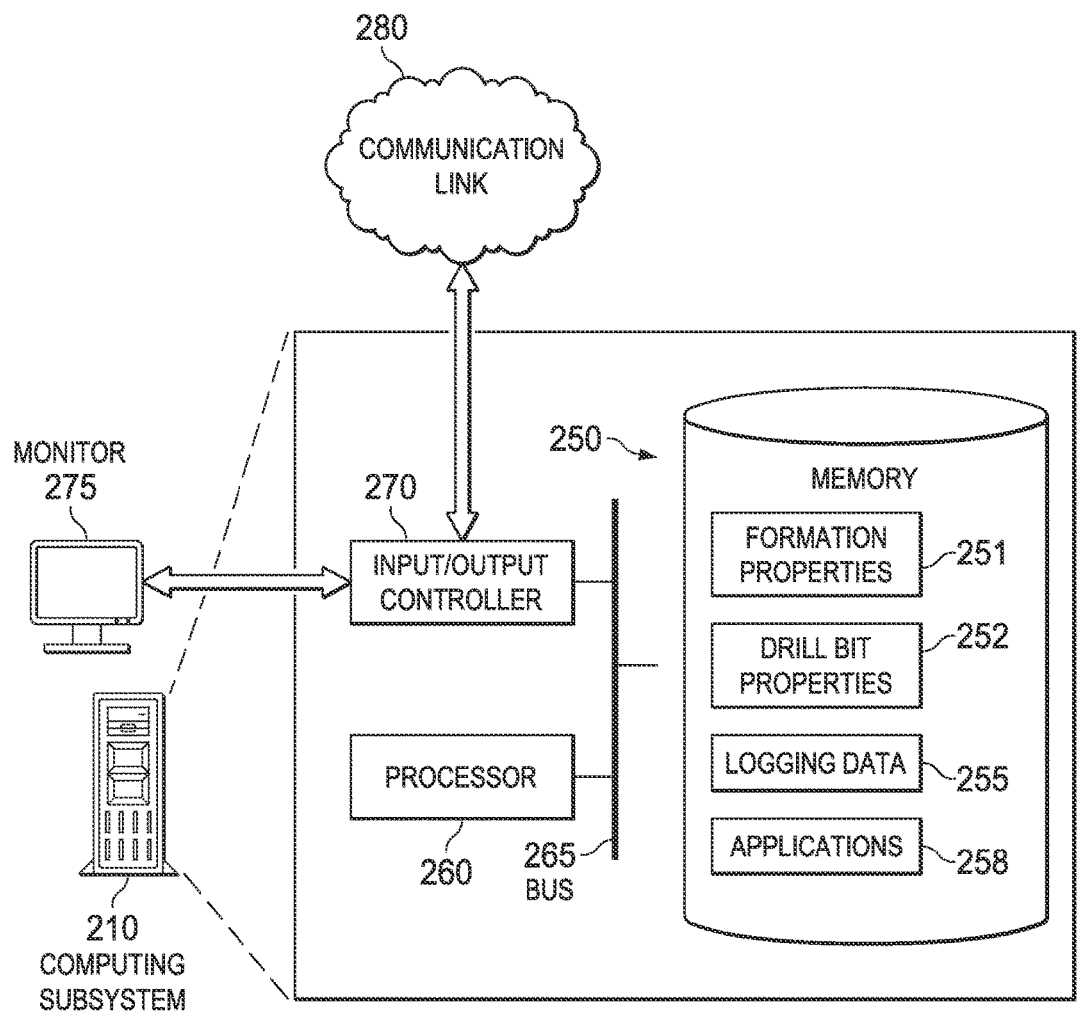
FIG. 2 illustrates an exemplary computing subsystem.

FIG. 2 illustrates an exemplary computing subsystem. Computing subsystem 210 may be located at or near one or more wellbores of well system 100 or at a remote location. All or part of computing subsystem 210 may operate as a component of or independent of well system 100 or independent of any other components shown in FIG. 1A. Computing subsystem 210 may include memory 250, processor 260, and input/output controllers 270 communicatively coupled by bus 265.

Processor 260 may include hardware for executing instructions, such as those making up a computer program, such as application 258. As an example and not by way of limitation, to execute instructions, processor 260 may retrieve (or fetch) the instructions from an internal register, an internal cache, and/or memory 250; decode and execute them; and then write one or more results to an internal register, an internal cache, and/or memory 250. This disclosure contemplates processor 260 including any suitable number of any suitable internal registers, where appropriate. Where appropriate, processor 260 may include one or more arithmetic logic units (ALUs); be a multi-core processor; or include one or more processors 260. Although this disclosure describes and illustrates a particular processor, this disclosure contemplates any suitable processor.

In some embodiments, processor 260 may execute instructions, for example, to generate output data based on data inputs. For example, processor 260 may run application 258 by executing or interpreting software, scripts, programs, functions, executables, or other modules contained in application 258. Processor 260 may perform one or more operations related to FIGS. 3-7. Input data received by processor 260 or output data generated by processor 260 may include formation properties 251, drill bit properties 252, and logging data 255.

Memory 250 may include, for example, random access memory (RAM), a storage device (e.g., a writable read-only memory (ROM) or others), a hard disk, a solid state storage device, or another type of storage medium. Computing subsystem 210 may be preprogrammed or it may be programmed (and reprogrammed) by loading a program from another source (e.g., from a CD-ROM, from another computer device through a data network, or in another manner). In some embodiments, input/output controller 270 may be coupled to input/output devices (e.g., monitor 275, a mouse, a keyboard, or other input/output devices) and to communication link 280. The input/output devices may receive and transmit data in analog or digital form over communication link 280.

Memory 250 may store instructions (e.g., computer code) associated with an operating system, computer applications, and other resources. Memory 250 may also store application data and data objects that may be interpreted by one or more applications or virtual machines running on computing subsystem 210. For example, formation properties 251, drill bit properties 252, logging data 255, and applications 258 may be stored in memory 250. In some implementations, a memory of a computing device may include additional or different data, applications, models, or other information.

Formation properties 251 may include information that may be used to determine the properties of the formation (e.g., the volume percentage of shale and sandstone, gamma ray readings, confined rock strengths, and/or unconfined rock strength). Drill bit properties 252 may include information that may provide information about the drill bit (e.g., the diameter of a drill bit, the diameter of a cutting element, the volume of the cutting element, the placement of the cutting element on the drill bit, rock-drill bit interaction constant, and/or bit wear coefficients). Logging data 255 may include information on the logging performed in subterranean region 104 (e.g., gamma ray readings performed in the wellbore). Values from formation properties 251, drill bit properties 252, and logging data 255 may be used to calculate the wear of a cutting element on a drill bit.

Applications 258 may include software applications, scripts, programs, functions, executables, or other modules that may be interpreted or executed by processor 260. Applications 258 may include machine-readable instructions for performing one or more operations related to FIGS. 3-7. Applications 258 may include machine-readable instructions for calculating the wear of a cutting element on a drill bit and may be used for any suitable subterranean operation. For example, applications 258 may be configured to approximate the cutting element and determine the wear of the cutting element based on real time data during a subterranean operation. Applications 258 may generate output data and store output data in memory 250, in another local medium, or in one or more remote devices (e.g., by sending output data via communication link 280).

Communication link 280 may include any type of communication channel, connector, data communication network, or other link. For example, communication link 280 may include a wireless or a wired network, a Local Area Network (LAN), a Wide Area Network (WAN), a private network, a public network (such as the Internet), a wireless network, a network that includes a satellite link, a serial link, a wireless link (e.g., infrared, radio frequency, or others), a parallel link, or another type of data communication network.

Generally, the techniques described here may be performed at any time, for example, before, during, or after a subterranean operation or other event. In some instances, the techniques described may be implemented in real time, for example, during a drilling operation. Additionally, computing subsystem 210 may be located on the surface of the wellbore or may be located downhole as part of a downhole tool or bottom hole assembly.

Figure 3A:
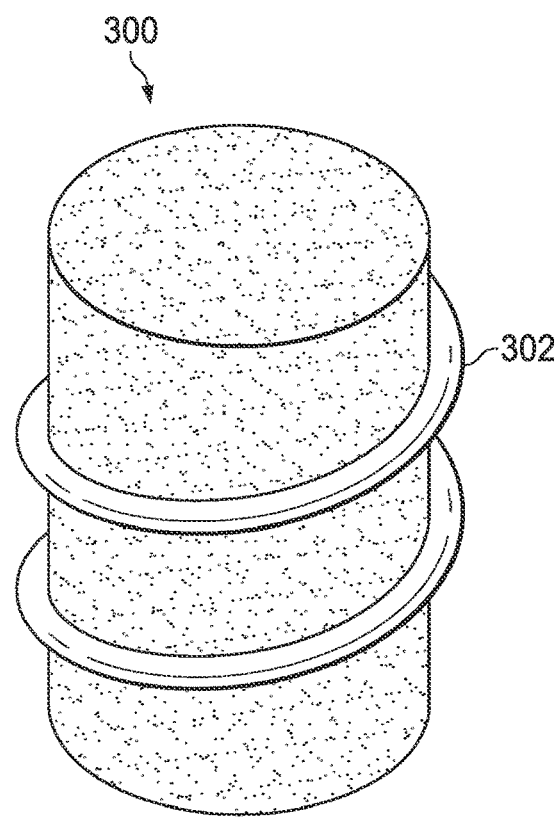
FIGS. 3A and 3B illustrate a schematic drawing and a spread-out view, respectively, of a travel track of a cutting element on a drilling tool.
Figure 3B:
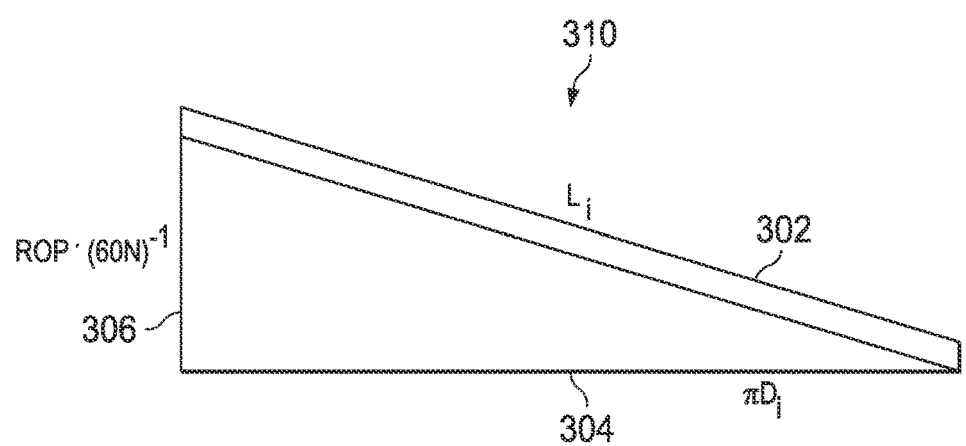

In order to estimate the wear on a cutting element, the traveling track and geometry of the cutting element may be approximated. FIGS. 3A and 3B illustrate a schematic drawing and a spread-out view, respectively, of a travel track of a cutting element on a drilling tool. As drill bit 101 makes a revolution during a drilling operation, a travel track of a cutting element may be modeled by a helical curve on the surface of a cylinder. For example, in FIG. 3A, curve 302 illustrates the traveling track of a cutting element (e.g., cutting element 128 of drill bit 101 shown in FIG. 1B) along cylinder 300. The length of the travel track of a cutting element on a drilling tool may be modeled by flattening the surface of cylinder 300, as shown in FIG. 3B. Flattening the surface of cylinder 300 creates right triangle 310. Triangle leg 304 is the circumference of cylinder 300 and triangle leg 306 is defined by the ROP divided by the rotary speed of drill bit 101. Hypotenuse 302 of triangle 310 corresponds to the travel track of a cutting element per turn of drill bit 101, as illustrated by curve 302 in FIG. 3A. Therefore, using geometry principles to calculate the hypotenuse of a right triangle, the travel track of a cutting element on a drilling tool per turn of drill bit 101, $L_i$, is calculated as $$L_i = \sqrt{(\pi D_i)^2 + \left(\frac{ROP}{60\,N}\right)^2} \qquad (2)$$

where $D_i$ is the diameter of cylinder 302 and N is the rotary speed of drill bit 101. To determine the number of turns, m, drill bit 101 makes to advance X feet, the following equation may be used.

$$m = 60 \frac{X}{ROP} N \qquad (3)$$

The rotary speed of a drill bit is typically stated in revolutions per minute while the ROP is typically stated in feet per hour. Therefore, in Equations 2 and 3 above, a unit conversion of 60 is used to convert the rotary speed from revolutions per minute to revolutions per hour.

The total length of a travel track of a cutting element on a drilling tool, L, during a drilling operation may be calculated by multiplying the number of turns made by drill bit 101 and the length of a travel track of a cutting element on a drilling tool per turn.

$$L = m L_i = X \sqrt{1 + (\pi D_i)^2 \left(\frac{60N}{ROP}\right)^2} \qquad (4)$$

In most cases, triangle leg 306, which represents ROP/60N, is much smaller than triangle leg 304, which represents the circumference of cylinder 300, $\pi D_i$. Therefore the equation for the total length of a travel track of a cutting element on a drilling tool can be simplified to become $$L = m L_i \approx m \pi D_i \approx \pi D_i \left(\frac{60 N X}{ROP}\right) \qquad (5)$$

Figure 4A:
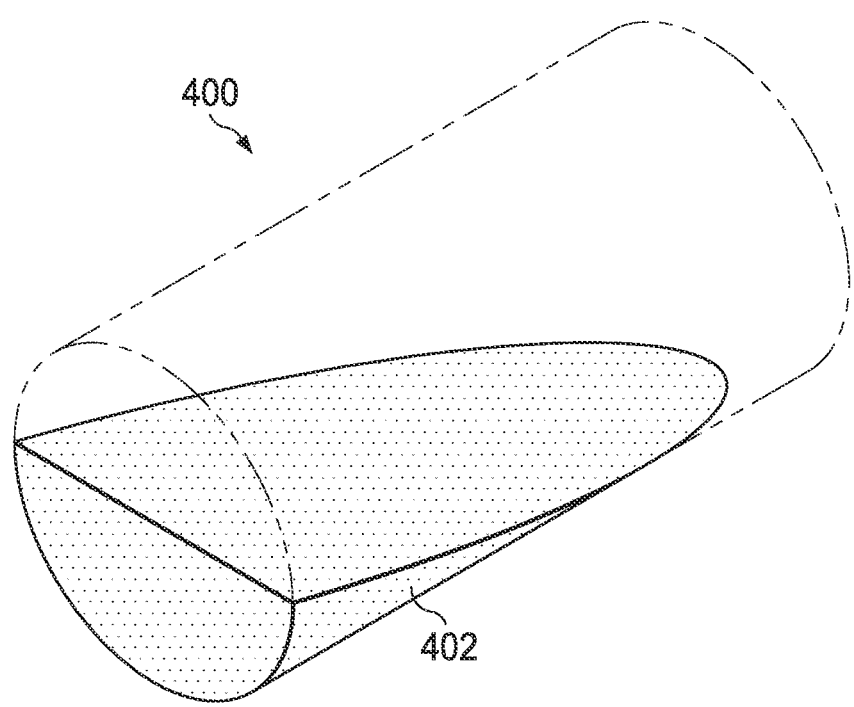
FIGS. 4A and 4B illustrate a PDC cutting element and its inverse pyramid approximation.
Figure 4B:
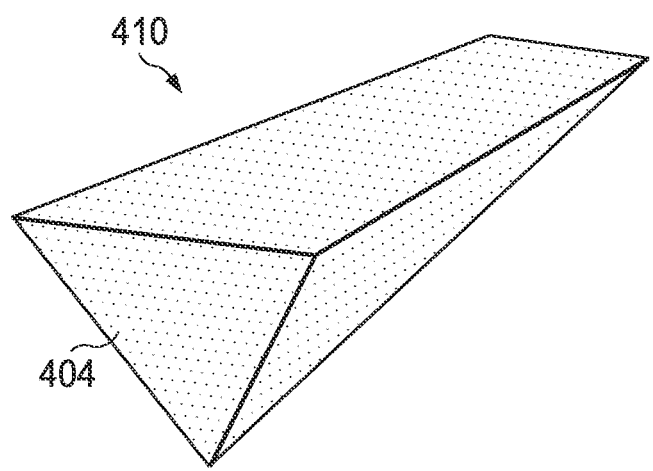

In addition to estimating the travel track of a cutting element on a drilling tool, the volume of the cutting element may also be estimated in order to determine the volume of the cutting element removed due to wear during a drilling operation. FIGS. 4A and 4B illustrate a PDC cutting element and its inverse pyramid approximation. As drill bit 101 performs a drilling operation, the cutting elements experience wear and a portion of each cutting element is removed. The cutting element may be modeled as cylinder 400, shown in FIG. 4A. The removed portion of the cutting element is shown by the shaded portion 402 and may be approximated by inverse pyramid 410, shown in FIG. 4B. The volume of the removed portion of the cutting element may be referred to as $V_0$. While the example illustrated in FIGS. 4A and 4B are specific to a PDC cutting element, the techniques described may be used with any type of drill bit or cutting element on a drilling tool.

Figure 5:
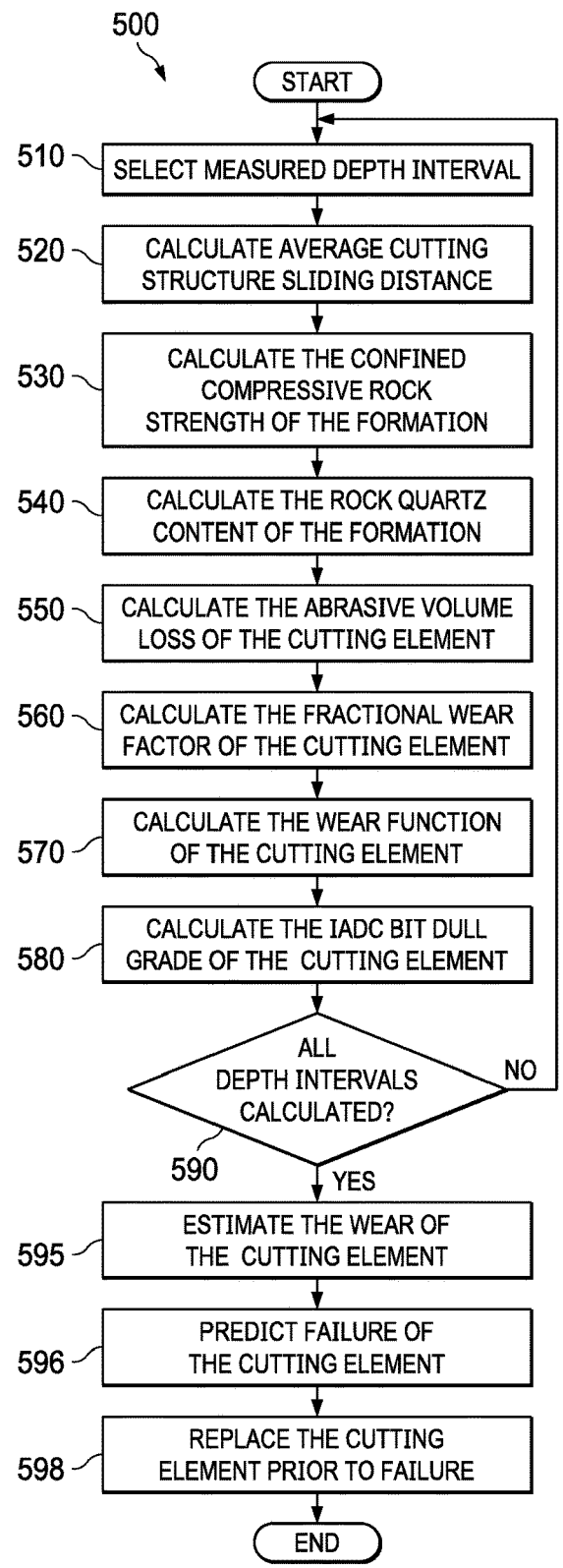
FIG. 5 illustrates a flow chart of a method for modeling the predicted wear of a cutting element.

FIG. 5 illustrates a flow chart of a method 500 for modeling the predicted wear of a cutting element on a drilling tool. The steps of method 500 may be performed by various computer programs, models or any combination thereof, configured to simulate and design drilling systems, apparatuses and devices. The programs and models may include instructions stored on a computer readable medium and operable to perform, when executed, one or more of the steps described below. The computer readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer readable media. Collectively, the computer programs and models used to simulate and design drilling systems may be referred to as a "drilling engineering tool" or "engineering tool." For example, the engineering tool may be one of the applications in applications 258 shown in FIG. 2. For illustrative purposes, method 500 is described with respect to drill bit 101 illustrated in FIGS. 1A and 1B; however, method 500 may be used to determine the wear of any cutting element on any drilling tool.

Method 500 may begin at step 510. At step 510, the engineering tool may determine the first measured depth $X_i$. $X_i$ may be a small increment to allow for accurate approximations. Data varies with the depth of the wellbore therefore smaller incremental depths may reduce any variability introduced by averaging data across the incremental depth.

At step 520, the engineering tool may calculate the average sliding distance of a cutting element, $\bar{L}$. The average diameter of a cylindrical representation of a cutting element, $D_i$, as shown in FIG. 3A, may be approximated as $$D_i = \frac{D_b}{2} \tag{6}$$

where $D_b$ is the diameter of drill bit 101. Therefore, using the equation for L derived in the discussion accompanying FIG. 3 (Equation 5), the average sliding distance of a cutting element, $\bar{L}$, is $$\bar{L} = \pi D_i \left(\frac{60NX}{ROP}\right) = \left(\frac{\pi \frac{D_b}{2}}{12}\right)\left(\frac{60NX}{ROP}\right) \tag{7}$$

where the $\frac{1}{12}$ factor is required for unit conversion (inches to feet). If all units are consistent, the $\frac{1}{12}$ factor will not be required. After substituting the equation for ROP (Equation 1) into the equation for $\bar{L}$, the average sliding distance of a cutting element becomes $$\bar{L} = 2.5\pi \frac{SD_b^2 NX}{W_f G \cdot WOB^a \cdot N^b} \tag{8}$$

At step 530, the engineering tool may determine the value for the confined compressive rock strength. The confined compressive rock strength, S, is defined as $$S = S_0(1 + a_S P_e^{b_S}) \tag{9}$$

where $S_0$ is the unconfined rock strength, $P_e$ is the differential pressure, in pounds per square inch (psi), and $a_s$ and $b_s$ are the rock strength lithology coefficients. Values for rock strength lithology coefficients for permeable and impermeable geological formations are shown in the table below.

| Formation | Permeable | Impermeable |
|---|---|---|
| $P_e$ | $P_{bh}-P_p$ | $P_{bh}$ |
| $a_S$ | 0.0133 | 0.00432 |
| $b_S$ | 0.577 | 0.782 |

$P_e$ may be approximated as the bottomhole pressure, $P_{bh}$, for impermeable geological formations. The bottomhole pressure is $$P_{bh} = 0.052\gamma_f(X_0 + X) \tag{10}$$

where $X_0$ is the starting depth of the bit run, X is the ending depth of the bit run, and $\gamma_f$ is the specific gravity of the drilling fluid.

In some embodiments, gamma ray readings may be used to find the unconfined rock strength. If the gamma ray reading is greater than 140 API, the geological formation is considered to be shale and $S_0$ is equal to 9000. If the gamma ray reading is less than 40 API, the geological formation is considered to be sandstone and $S_0$ is equal to 15000. If the gamma ray reading is between 40 API and 140 API, the geological formation is considered to be a mixture of shale and sandstone and the unconfined rock strength is $$S_0 = S_{0,sh} + (S_{0,sand} - S_{0,sh})e^{-5V_{sh}} \tag{11}$$

where $S_{0,sh}$ is the unconfined rock strength of shale, $S_{0,sand}$ is the unconfined rock strength of sandstone, and $V_{sh}$ is the volume percentage of shale in the geological formation.

Figure 6:
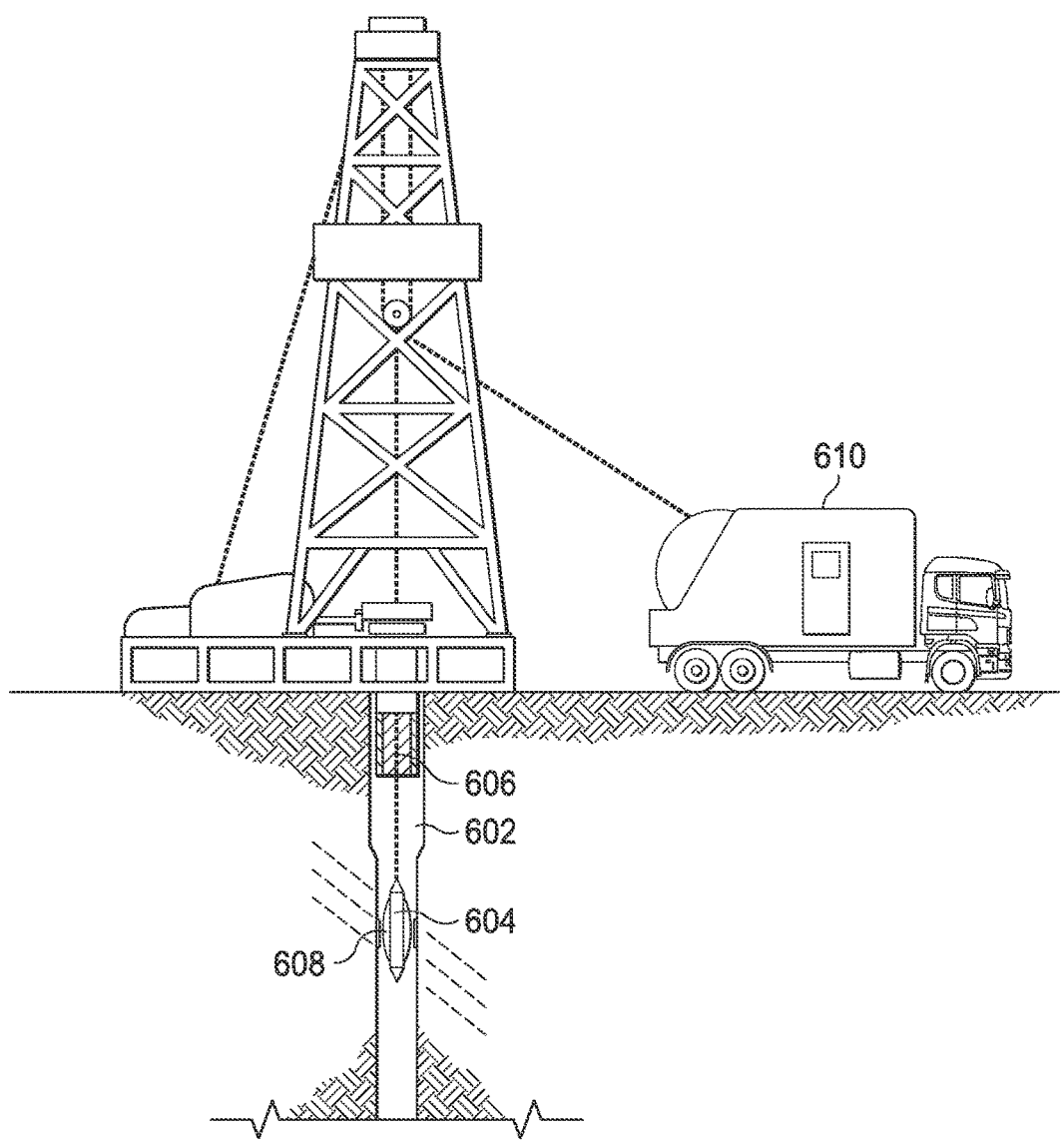
FIG. 6 illustrates an example embodiment of a wireline implementation.

Gamma ray logging may be performed in real-time with sensors located on BHA 120 or at locations along drill string 103 illustrated in FIG. 1A. Gamma ray logging may also be performed by placing sensors on a wireline device that is lowered into the wellbore after drilling. FIG. 6 illustrates an example embodiment of a wireline implementation. At various times during the drilling process, the drill string may be removed from wellbore 602. Once the drill string has been removed, logging operations may be conducted using wireline tool 604, e.g., an instrument that is suspended into wellbore 602 by cable 606 having conductors for transporting power to the tool and telemetry from the tool body to the surface. Wireline tool 604 may include one or more logging tools 608. Logging tool 608 may be communicatively coupled to cable 606. Logging facility 610 (shown in FIG. 6 as a truck, although it may be any other structure) may collect measurements from logging tool 608, and may include computing facilities for controlling, processing, and/or storing the measurements gathered by logging tool 608. The computing facilities may be communicatively coupled to logging tool 608 by way of cable 606.

The computing facilities included in logging facility 610 may be similar to computing subsystem 210 shown in FIG. 2 and may include a processor coupled to a memory. The processor may include, for example, a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in the memory. Such program instructions or process data may constitute portions of software for carrying out simulation, monitoring, or control of the directional drilling described herein. The memory may include any system, device, or apparatus configured to hold and/or house one or more memory modules; for example, the memory may include read-only memory, random access memory, solid state memory, or disk-based memory. Each memory module may include any system, device or apparatus configured to retain program instructions and/or data for a period of time (e.g., computer-readable non-transitory media).

Referring back to FIG. 5, at step 540, the engineering tool may calculate the rock quartz content of the geological formation. The rock quartz content, $a_0$, may be estimated by using known methods of calculating the quartz content of geological formations. For example, the quartz content of shale is approximately 10% and the quartz content of sandstone is approximately 80%. Therefore, for a geological formation made of shale and sandstone, the rock quartz content can be calculated as $$a_0 = 0.1 \cdot V_{sh} + 0.8 \cdot V_{sand} \tag{12}$$

where $V_{sh}$ is the volume percentage of shale in the geological formation and $V_{sand}$ is the volume percentage of sandstone in the geological formation. The volume percentage of each type of rock in a geological formation can be estimated from any known method for calculating the properties of a geological formation, such as gamma ray data, sonic data, density data, porosity data, or any other suitable well logging technique.

For example, gamma ray logging may be used to measure the naturally occurring gamma radiation, created from potassium, thorium, and uranium, of the geological formation in a wellbore. Different types of rock emit differing amounts and different spectra of natural gamma radiation thus allowing for determination of the type of rock in the geological formation. Shale typically emits more gamma rays than other sedimentary formations, such as sandstones, gypsum, dolomite, or limestone. The difference in the gamma ray radiation between shales, sandstones, and other carbon based rocks allows for distinguishing between shales and non-shales.

Once a gamma ray reading at a specific depth is recorded, the volume percentage of shale may be estimated by $$V_{sh} = 0.33(2^{2I_{GR}} - 1) \tag{13}$$

where $I_{GR}$ is the shale index. The shale index is calculated by using the gamma ray readings:

$$I_{GR} = \frac{GR - GR_{sand}}{GR_{shale} - GR_{sand}} \tag{14}$$

where GR is the gamma ray reading, $GR_{sand}$ is the gamma ray reading of clean sand, and $GR_{shale}$ is the gamma ray reading of shale. If the gamma ray reading is greater than 140, the rock is considered to be shale. If the gamma ray reading is less than 40, the rock is considered to be sandstone. Limestone, dolomite, and other rocks may also have similar gamma ray readings as sandstone. However, for the purposes of modeling the wear of a cutting element, limestone and dolomite can be estimated as sandstone. The exemplary embodiment described in step 540 is based on a shale index, but indices for other rock types may be used that utilize known index calculations. Once the volume percentage of shale is known, the volume percentage of sandstone can be calculated by $$V_{sand} = 1 - V_{sh} \tag{15}$$

The volume of each type of geological formation can be estimated using any known well logging technique. In sonic logging, a well logging tool measures the ability of a formation to transmit seismic waves, which varies with rock texture. Density logging measures the bulk density of a geological formation along the length of a wellbore. The bulk density is a function of the density of the minerals in the formation and the fluid enclosed in the pore spaces of the formation. Porosity logging uses a neutron source to measure the hydrogen index of a geological formation. The hydrogen index is related to the porosity of the formation. Sonic logging, porosity logging, and density logging may be performed via the same methods described with respect to gamma ray logging and FIG. 6.

At step 550, the engineering tool may calculate the abrasive volume loss of drill bit 101. The abrasive volume loss, $\Delta V$, is defined by $$\Delta V = \beta a_0 S F_a L \tag{16}$$

where $\beta$ is a constant related to the geological formation and drill bit 101 properties, $\alpha_0$ is the rock quartz content calculated at step 530, $F_a$ is the drill string axial force applied to drill bit 101, and L is the sliding distance of the cutting element. The equation for L, Equation 8 as stated at step 510, may be substituted for L in the formula for the abrasive volume loss and the WOB on drill bit 101 may be substituted for the drill string axial force, $F_a$. Therefore the formula for the abrasive volume loss, assuming a and b are equal to 1.0, becomes $$\Delta V = 2.5\pi \beta \alpha_0 \frac{XS^2 D_b^2}{W_f G} \tag{17}$$

Data analysis indicates that a and b are usually found to be equal to approximately 0.8. In order to preserve linearity in the cutting element wear model, a, the weight exponent, and b, the rotational speed exponent, are assumed to be equal to 1.0. Both factors can be calculated using the WOB and ROP values from real time data. Because WOB and ROP vary during the course of a drilling operation, the values of a and b would also vary. However, the abrasive volume loss may be accurately approximated using the assumption that a and b are equal to 1.0.

In step 560, the engineering tool may calculate the fractional wear factor of the cutting element. Using the inverse pyramid approximation discussed in relation to FIG. 4B, the fractional wear factor of the cutting element, $y_i$, is $$y_i = \frac{\Delta h}{h} = \frac{\Delta h}{2R} = 0.5\frac{\Delta h}{R} \approx 0.5\left(\frac{\Delta V}{V_0}\right)^{1/3} \quad (18)$$

where R is the radius of cylinder 400, shown in FIG. 4A, and h is the height of cylinder 400. Substituting the equation for ΔV (Equation 17), the equation for the fractional wear factor of the cutting element becomes $$y_i^3 = 2.5\pi \frac{\beta}{8V_0} \alpha_{0i} \frac{S_i^2 D_b^2 X_i}{(1-y_i)G} + y_{i-1}^3 \quad (19)$$

The fractional wear factor of the cutting element at a measured depth $X_i$, as determined at step 510, can be calculated by solving Equation 19. A computer program may be used to solve the equation by using $y_{i-1}$ as the starting value. $y_{i-1}$ will be $y_0$, which is zero for a new cutting element. If the incremental depth $X_i$ is small, as discussed at step 510, replacing $y_i$ on the right-hand side of the equation with provides a good approximation. Therefore the fraction wear factor of the cutting element becomes $$y_i = \sqrt[3]{\frac{\pi}{3.2}\frac{\beta}{V_0}\frac{D_b^2}{G}\frac{\alpha_{0i}S_i^2 X_i}{(1-y_{i-1})} + y_{i-1}^3} \quad (20)$$

This equation for the fractional wear factor of the cutting element may allow for quick calculation of the fractional wear of the cutting element, which is desirable for downhole automation.

At step 570, the engineering tool may calculate the tool wear function, $W_f$, for the cutting element using the following equation.

$$W_f = 1 - \frac{\Delta h}{h} = 1 - y_i \quad (21)$$

At step 580, the engineering tool may calculate the International Association of Drilling Contractors (IADC) bit dull grade as $$\Delta BG = 8\frac{\Delta h}{h} = 8y_i \quad (22)$$

The IADC bit dull grading system is a systematic method for evaluating the wear of a drill bit.

At step 590, the engineering tool may determine if all depth intervals have been analyzed. If all depth intervals have been analyzed, method 500 may proceed to step 595. If all depth intervals have not been analyzed, method 500 may return to step 510 to analyze the next depth interval and continue to analyze each depth interval until the desired length of the geological formation has been analyzed. The wear functions of each depth interval may be used to calculate a cumulative wear volume. The cumulative wear volume may be the total wear of the cutting element over the length of the formation drilled by the drilling tool to which the cutting element is attached.

At step 595, the engineering tool may use the tool wear function calculated in step 570 and/or the bit dull grade calculated in step 580 to estimate the wear of the cutting element. The wear of the cutting element may be used to plan the subterranean operation or may be used during the subterranean operation. For example, at step 596, the tool wear function and/or the bit dull grade may be used to predict when the cutting element may fail due to excessive wear. At step 598, an operator of the drilling operation may replace the drill bit or individual cutting elements on the drill bit prior to failure. In other embodiments, the tool wear function and/or the bit dull grade may be used to select a drill bit that may be capable of completing the subterranean operation prior to failure of the drill bit and/or cutting elements on the drill bit. In further embodiments, the tool wear function and/or the bit dull grade may be used to provide more accurate ROP predictions and predict the severity of stick slip, bit balling, and vibration of the drilling tool to which the cutting element is coupled.

Modifications, additions, or omissions may be made to method 500 without departing from the scope of the present disclosure. For example, the order of the steps may be performed in a different manner than that described and some steps may be performed at the same time. Additionally, each individual step may include additional steps without departing from the scope of the present disclosure. The steps of method 500 describe equations derived for a PDC drill bit. However, the method 500 may be performed for any type of drilling tool. The relevant equations for calculating each step of method 500 for a tool other than a PDC drill bit may be obtained by adapting the same methodology of this disclosure to that tool. For example, for a roller cone bit with chisel teeth, Equation 18 becomes $$y_i = \frac{\Delta h}{h} = \left(\frac{\Delta V}{V_0}\right)^{1/2} \quad (23)$$

The average volume loss per tooth is $$\Delta V = \beta\alpha_0\pi D_i S \cdot WOB\left(\frac{60N \cdot X}{ROP}\right) \quad (24)$$

where the ROP is from the model for a roller cone bit.

Figure 7B:
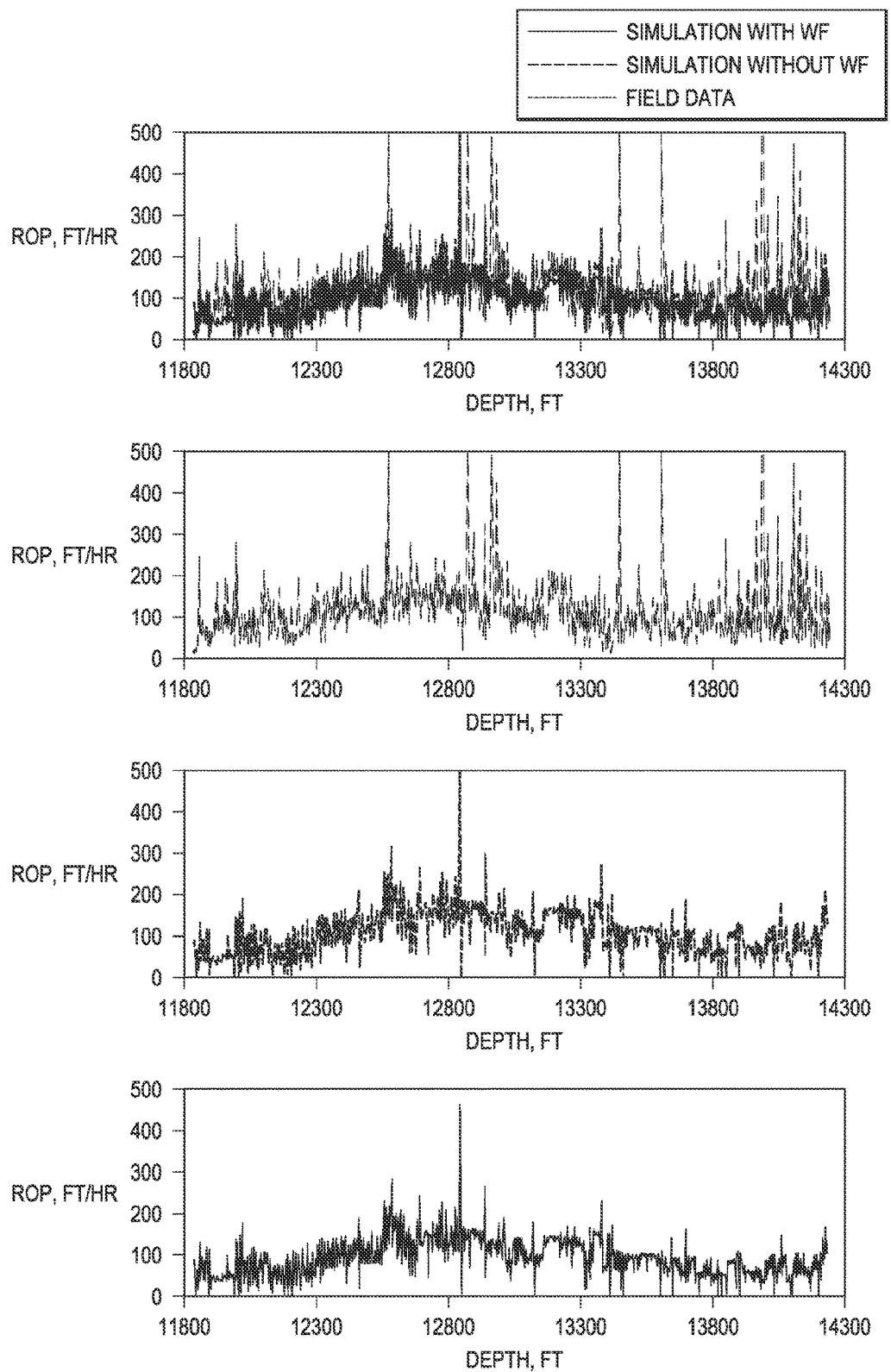
FIG. 7B illustrates a graph of rate of penetration (ROP) from collected field data, ROP from a simulation without a correction for bit wear, and ROP from a simulation with a correction for bit wear as a function of drilling depth.

FIGS. 7A, 7B, and 7C illustrate the results from an exemplary embodiment of method 500 as shown in FIG. 5. Field data from a drilling operation using a PDC drill bit was used to validate the results from the analytical model. The geometry of the drill bit and drilling parameters, such as WOB and rotary speed, were used to find the average sliding distance of a cutting element, at step 520.

FIG. 7A illustrates a graph of a gamma ray profile as a function of drilling depth from a drilling operation. The gamma ray reading at each incremental measured depth is used to determine the value for the unconfined rock strength, $S_0$. The value of $S_0$ is used at step 530 to find the confined compressive rock strength. The gamma ray profile data is also used to find the rock quartz content at step 540. A least mean square fit method is used to find G, a model constant. The least mean square fit method minimized $\Sigma(ROP_{sim} - ROP_{actual})^2$. $ROP_{sim}$ is calculated using the equation for ROP discussed above. G can be determined based upon trending models and/or pattern recognition from existing bit run records. Once the value for G is known, the value for ΔV is calculated at step 550 and used in the calculation of the fractional wear factor of the cutting element at step 560. A least mean square fit is also used to determine the bit wear coefficient, $W_c$, which is equal to $\beta/V_0$. The value of the bit wear coefficient is used in step 560 as part of the calculation of the fractional wear factor of the cutting element. Once the fractional wear factor of the cutting element is calculated, the tool wear function is calculated at step 570, and the simulated ROP is also calculated. Finally, the IADC bit dull grade is calculated at step 580. The method is repeated for each incremental measured depth.

FIG. 7B illustrates a graph of ROP from collected field data, ROP from a simulation without a correction for bit wear, and ROP from a simulation with a correction for bit wear as a function of drilling depth. The simulated ROP with a correction for bit wear averaged 84.0 feet per hour over the entire bit run. The actual average ROP was 80.0 feet per hour. The simulated ROP without a correction for bit wear averaged 96 feet per hour. Therefore the simulated ROP with a bit wear correction was within 5% of the actual ROP value where the simulated ROP without a bit wear correction was almost 20% larger than the actual ROP.

FIG. 7C illustrates a graph of the simulated fractional wear factor of a cutting element as a function of drilling depth. The average simulated wear factor of the cutting element was used to find the IADC bit dull grade of Grade 1.68. The actual IADC bit dull grade was Grade 2. The IADC bit dull grade is a subjective measurement, therefore the difference between the simulated value and the actual value was determined to be a good agreement. In some embodiments, the graphs shown in FIGS. 7A through 7C may be generated in real time during a subterranean operation. The graphs may be displayed to an operator of the subterranean operation to allow the operator to monitor and/or adjust the operation. In other embodiments, the graphs shown in FIGS. 7A through 7C may be generated prior to the subterranean operation to provide information used to plan or simulate the subterranean operation. Embodiments disclosed herein include:

A. A method that includes selecting a first incremental distance along a length of a formation, determining a first characteristic of the formation along the first incremental distance, deriving a first fractional wear factor, $y_i$, for a cutting element on a drilling tool based on the first characteristic of the formation and a first operating condition of the cutting element, calculating a first wear function, $W_{f1}$, of the cutting element based on the first fractional wear factor, and estimating an amount of wear of the cutting element during a drilling operation based on the first wear function.

B. A non-transitory machine-readable medium comprising instructions stored therein. The instructions are executable by one or more processors to facilitate performing a method that includes selecting a first incremental distance along a length of a formation, determining a first characteristic of the formation along the first incremental distance, deriving a first fractional wear factor, $y_1$, for a cutting element on a drilling tool based on the first characteristic of the formation and a first operating condition of the cutting element, calculating a first wear function, $W_{f1}$, of the cutting element based on the first fractional wear factor, and estimating an amount of wear of the cutting element during a drilling operation based on the first wear function.

C. A drilling system that includes a drill string and a drilling tool coupled to the drill string. The drilling tool includes a cylindrical body, a plurality of blades on the cylindrical body, and a plurality of cutting elements on one of the plurality of blades. The wear of at least one of the plurality of cutting elements during a drilling operation is estimated by selecting a first incremental distance along a length of a formation, determining a first characteristic of the formation along the first incremental distance, deriving a first fractional wear factor, $y_i$, for the at least one cutting element based on the first characteristic of the formation and a first operating condition of the at least one cutting element, and calculating a first wear function, $W_{f1}$, of the at least one cutting element based on the first fractional wear factor.

Each of embodiments A, B, and C may have one or more of the following additional elements in any combination: Element 1: further comprising selecting a second incremental distance along the length of the formation, determining a second characteristic of the formation along the second incremental distance, deriving a second fractional wear factor, $y_2$, for the cutting element based on the second characteristic of the formation and a second operating condition of the cutting element, calculating a second wear function, $W_{f2}$, of the cutting element based on the second fractional wear factor, and estimating the amount of wear of the cutting element during the drilling operation based on the second wear function. Element 2: further comprising predicting a cumulative wear volume of the cutting element over the length of the formation drilled by the drilling tool during the drilling operation based on the first wear function and the second wear function. Element 3: wherein the drilling tool comprises at least one of a drill bit and a hole enlarging tool. Element 4: wherein the first characteristic of the formation is determined with at least one of gamma ray logging data, sonic logging data, density logging data, and porosity logging data. Element 5: further comprising selecting the drilling tool based on the cumulative wear volume. Element 6: further comprising calculating a bit dull grade for the drilling tool based on the first fractional wear factor. Element 7: further comprising estimating a rate of penetration of the drilling tool during the drilling operation based on the first wear function.

Although the present disclosure and its advantages have been described in detail, it should be understood that various changes, substitutions and alterations can be made herein without departing from the spirit and scope of the disclosure as defined by the following claims. It is intended that the present disclosure encompasses such changes and modifications as fall within the scope of the appended claims.

What is claimed is:

1. A method comprising:
    selecting a first incremental distance along a length of a formation;
    determining a first characteristic of the formation along the first incremental distance;
    measuring a first operating condition of a cutting element in real-time during a drilling operation;
    deriving a first fractional wear factor, $y_1$, for the cutting element on a drilling tool based on the first characteristic of the formation, the first operating condition of the cutting element, the first incremental distance, a volume of the cutting element, a rock quartz content of the formation, a diameter of the drilling tool, and a confined compressive rock strength of the formation;
    calculating a first wear function, $W_{f1}$, of the cutting element based on the first fractional wear factor;
    estimating an amount of wear of the cutting element during the drilling operation based on the first wear function;
    predicting a failure of the cutting element during the drilling operation, based on the estimated wear of the cutting element; and
    replacing the cutting element prior to the failure.

2. The method of claim 1, further comprising:
selecting a second incremental distance along the length of the formation;
determining a second characteristic of the formation along the second incremental distance;
measuring a second operating condition of the cutting element in real-time during the drilling operation;
deriving a second fractional wear factor, $y_2$, for the cutting element based on the parameter of the cutting element, the second characteristic of the formation and the second operating condition of the cutting element;
calculating a second wear function, $W_{f2}$, of the cutting element based on the second fractional wear factor; and
estimating the amount of wear of the cutting element during the drilling operation based on the second wear function.

3. The method of claim 2, further comprising predicting a cumulative wear volume of the cutting element over the length of the formation drilled by the drilling tool during the drilling operation based on the first wear function and the second wear function.

4. The method of claim 3, further comprising selecting the drilling tool based on the cumulative wear volume.

5. The method of claim 1, wherein the drilling tool comprises at least one of a drill bit and a hole enlarging tool.

6. The method of claim 1, wherein the first characteristic of the formation is measured with at least one of gamma ray logging data, sonic logging data, density logging data, and porosity logging data.

7. The method of claim 1, further comprising calculating a bit dull grade for the drilling tool based on the first fractional wear factor.

8. The method of claim 1, further comprising estimating a rate of penetration of the drilling tool during the drilling operation based on the first wear function.

9. A non-transitory machine-readable medium comprising instructions stored therein, the instructions executable by one or more processors to facilitate performing a method comprising:
determining a first characteristic of the formation along the first incremental distance;
measuring a first operating condition of a cutting element in real-time during a drilling operation;
deriving a first fractional wear factor, $y_1$, for the cutting element on a drilling tool based on the first characteristic of the formation, the first operating condition of the cutting element, the first incremental distance, a volume of the cutting element, a rock quartz content of the formation, a diameter of the drilling tool, and a confined compressive rock strength of the formation;
calculating a first wear function, $W_{f1}$, of the cutting element based on the first fractional wear factor;
estimating an amount of wear of the cutting element during the drilling operation based on the first wear function;
predicting a failure of the cutting element during the drilling operation, based on the estimated wear of the cutting element; and
replacing the cutting element prior to the failure.

10. The non-transitory machine-readable medium of claim 9, the method further comprising:
selecting a second incremental distance along the length of the formation;
determining a second characteristic of the formation along the second incremental distance;
measuring a second operating condition of the cutting element in real-time during a drilling operation;
deriving a second fractional wear factor, $y_2$, for the cutting element based on the parameter of the cutting element; the second characteristic of the formation and the second operating condition of the cutting element;
calculating a second wear function, $W_{f2}$, of the cutting element based on the second fractional wear factor; and
estimating the amount of wear of the cutting element during the drilling operation based on the second wear function.

11. The non-transitory machine-readable medium of claim 10, the method further comprising predicting a cumulative wear volume of the cutting element over the length of the formation drilled by the drilling tool during the drilling operation based on the first wear function and the second wear function.

12. The non-transitory machine-readable medium of claim 11, the method further comprising selecting the drilling tool based on the cumulative wear volume.

13. The non-transitory machine-readable medium of claim 9, wherein the drilling tool comprises at least one of a drill bit and a hole enlarging tool.

14. The non-transitory machine-readable medium of claim 9, wherein the first characteristic of the formation is measured with at least one of gamma ray logging data, sonic logging data, density logging data, and porosity logging data.

15. The non-transitory machine-readable medium of claim 9, the method further comprising calculating a bit dull grade for the drilling tool based on the first fractional wear factor.

16. The non-transitory machine-readable medium of claim 9, the method further comprising estimating a rate of penetration of the drilling tool during the drilling operation based on the first wear function.

17. A drilling system, comprising:
a drill string; and
a drilling tool coupled to the drill string, the drilling tool comprising:
a cylindrical body;
a plurality of blades on the cylindrical body; and
a plurality of cutting elements on one of the plurality of blades;
wherein the drilling tool is selected by:
determining a first characteristic of the formation along the first incremental distance;
measuring a first operating condition of a cutting element in real-time during a drilling operation;
deriving a first fractional wear factor, $y_1$, for the cutting element on a drilling tool based on the first characteristic of the formation, the first operating condition of the cutting element, the first incremental distance, a volume of the cutting element, a rock quartz content of the formation, a diameter of the drilling tool, and a confined compressive rock strength of the formation;
calculating a first wear function, $W_{f1}$, of the cutting element based on the first fractional wear factor;
estimating an amount of wear of the cutting element during the drilling operation based on the first wear function;
predicting a failure of the cutting element during the drilling operation, based on the estimated wear of the cutting element; and
replacing the cutting element prior to the failure.

18. The drilling system of claim 17, wherein the cutting element wear is estimated by a method further comprising:

selecting a second incremental distance along the length of the formation;

determining a second characteristic of the formation along the second incremental distance;

measuring a second operating condition of the cutting element in real-time during a drilling operation;

deriving a second fractional wear factor, $y_2$, for the cutting element based on the parameter of the cutting element; the second characteristic of the formation and the second operating condition of the cutting element;

calculating a second wear function, $W_{f2}$, of the at least one cutting element based on the second fractional wear factor; and estimating the amount of wear of the at least one cutting element during the drilling operation based on the second wear function.

19. The drilling system of claim 18, wherein the cutting element wear is further estimated by predicting a cumulative wear volume of the at least one cutting element over the length of the formation drilled by the drilling tool during the drilling operation based on the first wear function and the second wear function.

20. The drilling system of claim 17, wherein the first characteristic of the formation is measured with at least one of gamma ray logging data, sonic logging data, density logging data, and porosity logging data.

* * * * *